United States Patent [19]
Yamada et al.

[11] Patent Number: 5,991,442
[45] Date of Patent: Nov. 23, 1999

[54] METHOD AND APPARATUS FOR PATTERN RECOGNITION UTILIZING GAUSSIAN DISTRIBUTION FUNCTIONS

[75] Inventors: Masayuki Yamada; Yasuhiro Komori, both of Kawasaki, Japan

[73] Assignee: Canon Kabushiki Kaisha, Tokyo, Japan

[21] Appl. No.: 08/640,475

[22] Filed: May 1, 1996

[30] Foreign Application Priority Data

May 10, 1995 [JP] Japan .................................. 7-111972

[51] Int. Cl.$^6$ ........................................................ G06K 9/68
[52] U.S. Cl. ........................................ 382/218; 704/256
[58] Field of Search .................................. 382/181, 190, 382/209, 217, 218; 704/200, 256, 243, 238, 236

[56] References Cited

U.S. PATENT DOCUMENTS

| | | | |
|---|---|---|---|
| 4,587,670 | 5/1986 | Levinson et al. ........................ | 704/256 |
| 4,783,804 | 11/1988 | Juang et al. ............................ | 704/256 |
| 5,347,612 | 9/1994 | Fujimoto et al. ....................... | 704/243 |
| 5,608,840 | 3/1997 | Tsuboka .................................. | 704/236 |
| 5,687,287 | 11/1997 | Gandhi et al. .......................... | 704/247 |
| 5,715,367 | 2/1998 | Gillick et al. ........................... | 704/254 |

OTHER PUBLICATIONS

Rose et al. "Text Independent Speaker Identification Using Automatic Acoustic Segmentation." ICASSP 90. 1990 International Conference on Acoustics, Speech and Signal Processing, vol. 1, pp. 293–296, Apr. 1990.

Nathan et al. "On–Line Handwriting Recognittion Using Continuous Parameter HiddeN Markov Models." ICASSP 93. 1993 IEEE International Conference on Acoustics, Speech, and Signal Processing, vol. 5, pp. 121–124, Apr. 1993.

Chen et al. "Variable Duration Hidden markov Model and Morphological Segmentation for Handwritten Word Recognition." Proceedings. 1993 IEEE Computer Society Conference on Computer Vision and Pattern Recognition, pp. 600–601, Jun. 1993.

"Automatic Error Detection With Markov Word Models In Automatic Speech Recognition", IBM Technical Disclosure Bulletin, vol. 32, No. 5A, Oct. 1989, pp. 277–279.

X. Huang, et al., "Unified Techniques For Vector Quantisation And Hidden Markov Modeling Using Semi–continuous Models", 1989 International Conference on Acoustics, Speech, and Signal Processing, vol. May 23–26, 1989, pp. 639–642.

*Primary Examiner*—Jon Chang
*Attorney, Agent, or Firm*—Fitzpatrick, Cella, Harper & Scinto

[57] ABSTRACT

The present invention provides a method and apparatus for performing pattern recognition on given information such as speech data or image data with a reduced amount of calculations of the degree of matching associated with reference patterns. The method and apparatus provides a high speed operation without an increase in the amount of calculations of the degree of matching even when there are a great number of reference patterns. In this invention, the process of calculating the degree of matching includes: a scalar quantization step in which the value of each dimension of an input feature vector is scalar-quantized; a table look-up step in which a table is subjected to a look-up operation on the basis of the quantized value obtained in the scalar quantization step so as to obtain an output value of a reference pattern function for each dimension; and a cumulative matching degree calculation step in which the output value of the reference pattern function obtained in the table loop-up step is accumulated for all dimensions, and the resultant cumulative value is finally employed as the degree of matching between the reference pattern and the input feature vector.

23 Claims, 3 Drawing Sheets

METHOD AND APPARATUS FOR PATTERN RECOGNITION UTILIZING GAUSSIAN DISTRIBUTION FUNCTIONS

BACKGROUND OF THE INVENTION

1. Field of the Invention

The present invention relates to a method and apparatus for performing pattern recognition on an input pattern.

More specifically, the present invention relates to a method and apparatus for performing pattern recognition on a pattern obtained from input speech information so as to produce a sentence corresponding to the input speech information.

Furthermore, the present invention relates to a method and apparatus for achieving accurate pattern recognition with a reduced amount of computing operations.

2. Description of the Related Art

It is known in the art in pattern recognition technique that reference patterns are prepared in advance and a reference pattern which shows the best matching with the input pattern is selected and employed as the recognition result. In general, an input pattern can be represented by a feature vector including a plurality of feature values. On the other hand, the reference patterns can be represented as feature vectors representative of recognition results or represented by a function of the feature vector.

When the reference patterns are given as feature vectors representative of recognition results, the degree of matching between an input pattern and a reference pattern is represented by the distance between the feature vector associated with the input pattern and the feature vector associated with the reference pattern. On the other hand, if the reference patterns are given by a function of the feature vector, the degree of the matching between an input pattern and a reference pattern is represented by a value of the reference function of a given feature vector associated with an input pattern.

In many cases, the reference pattern function is given in a form of a multidimensional probability density function. If a given feature vector and the probability density function for an ith reference pattern are denoted by x and $P^i(\cdot)$, respectively, then the degree of matching $Y^i$ between the input pattern and the ith reference pattern is given by:

$$Y^i = P^i(x) \tag{1}$$

A function such as a Gaussian distribution function is employed as the probability density function. In some cases, a mixed density function such as the weighted sum of a plurality of probability density functions is also employed. When a mixed density function is employed, the degree of matching is represented by:

$$Y^i = \sum_m \omega_m^i P_m^i(x) \tag{2}$$

where $P_m^i(\cdot)$ is the mth probability density function associated with the ith reference pattern, and $w_m^i$ is the weight of the mth probability density function associated with the ith reference pattern.

Furthermore, when there is no correlation among the dimensions elements of the feature vector given by equation (1), the following function may also be employed as the reference pattern function:

$$Y^i = \prod_j P_j^i(x_j) \tag{3}$$

where $x_j$ is the feature value of the jth-dimension element of an input vector x, and $P_j^i(\cdot)$ is the probability density function corresponding to the jth-dimension element of the ith reference pattern.

In speech recognition, a hidden Markov model (HMM) is usually employed. In this case, the reference patterns correspond to individual HMM states, and the each HMM state represents the output probability corresponding to the input pattern.

In practical pattern recognition, $P^i(\cdot)$ merely represents the degree of matching between an input pattern and a reference pattern, and thus $P^i(\cdot)$ is not necessarily required to be a probability density function in a rigorous sense. $P^i(\cdot)$ can be regarded as the distance between an input vector and a reference pattern vector. Furthermore, a usual function other than distance functions may also be employed as $P^i(\cdot)$. Thus, in the following description, the term "reference pattern function" or "matching degree function" is used instead of the term "probability density function".

A problem in the conventional technique of pattern recognition described above is that equation (1) has to be calculated for all reference pattern functions. In particular, when there are a great number of reference patterns, it is required to perform a great amount of calculations to determine the degree of matching.

SUMMARY OF THE INVENTION

It is an object of the present invention to solve the above problem. More specifically, it is an object of the invention to provide a method and apparatus for performing high-speed pattern recognition with a reduced amount of calculations of the degree of matching associated with all reference patterns. It is another object of the invention to provide a method and apparatus for pattern recognition by which high-speed pattern recognition can be performed without an increase in the amount of calculations even when there are a great number of reference patterns. It is still another object of the invention to provide a method and apparatus for pattern recognition by which accurate pattern recognition can be performed without a significant increase in the amount of calculations of the degree of matching.

To achieve the above objects, the present invention provides a pattern recognition method for performing pattern recognition on the basis of calculation of the degree of matching between an input feature vector and a reference pattern, the pattern recognition method being characterized in that: in the matching degree calculation process, the degree of matching between the scalar-quantized feature vector and the reference pattern is accumulated for all dimensions, and the resultant cumulative value is employed as the degree of matching between the reference pattern and the input feature vector. The pattern recognition method further comprises a matching degree pre-calculation step in which the degree of matching is pre-calculated for each dimension of the reference pattern on the basis of the quantized value of each dimension elements of the scalar-quantized feature vector, and the obtained result is stored, wherein in the matching degree calculation process, the stored degree of matching corresponding to the quantized value is read and accumulated.

In the pattern recognition method of the invention, the matching degree pre-calculation step comprises: an approximate value calculation step in which an approximate value of the degree of matching between the quantized value of each dimension element and the value of the corresponding dimension of the reference pattern is calculated; an error calculation step in which a plurality of feature vectors are input, a calculation is performed so as to obtain an error of the degree of matching of the reference pattern calculated from each feature vector according to the above-described matching degree calculation process relative to the degree of matching of the reference pattern calculated in a more rigorous manner from the each feature vector, and the error is accumulated for all the plurality of feature vectors; and an optimization step in which the approximate value of the degree of matching is optimized so that the above-described error is minimized, and the optimized value is stored. Furthermore, in the above-described matching degree calculation process, the degree of matching of a reference pattern which is selected on the basis of the degree of matching calculated from a quantized value of each dimension element of a scalar-quantized feature value is replaced by a degree of matching which is calculated directly from the input feature vector without scalar quantization, and the replaced value is finally employed as the degree of matching between the reference pattern and the input feature vector.

According to another aspect of the present invention, there is provided a pattern recognition method for performing pattern recognition on the basis of calculation of the degree of matching between an input feature vector and a reference pattern, the pattern recognition method being characterized in that: the matching degree calculation process comprises: (a) a scalar quantization step in which the value of each dimension element of an input feature vector is scalar-quantized; (b) a table look-up step in which a table is subjected to a look-up operation on the basis of the quantized value obtained in the scalar quantization step so as to obtain an output value of a reference pattern function for each dimension; and (c) a cumulative matching degree calculation step in which the output value of the reference pattern function obtained in the table loop-up step is accumulated for all dimensions, and the resultant cumulative value is employed as the degree of matching between the reference pattern and the input feature vector.

In this pattern recognition method, the above-described table stores a pre-calculated value of the reference pattern function corresponding to the quantized value. Furthermore, the value stored in the above-described table is optimized in such a manner as to minimize the error of the degree of matching between the reference pattern calculated from each feature vector according to the matching degree calculation process relative to the degree of matching of the reference pattern calculated in a more rigorous manner from the each feature vector. Furthermore, in the scalar quantization step, the binary search method is employed. Furthermore, the above-described matching degree calculation process further comprises: (d) a matching degree re-calculation step in which a reference pattern is selected on the basis of the degree of matching calculated in the cumulative matching degree calculation step, and the degree of matching of the selected reference pattern is re-calculated from the input feature vector; and (e) a matching degree replacement step in which the degree of matching of the selected reference pattern is replaced by the degree of matching re-calculated in the matching degree re-calculation step. Furthermore, the above-described feature vector is a set of a plurality of feature vectors, and the matching degree calculation process calculates a set of degrees of matching, in the matching degree re-calculation step (d), a set of degrees of matching showing good matching as a whole is selected, and the degrees of matching are re-calculated from the input feature vector; and in the matching degree replacement step (E), the set of selected degrees of matching is replaced by the set of degrees of matching calculated in the matching degree re-calculation step. Furthermore, the reference pattern function is selected from probability density functions, wherein the probability density functions may include a Gaussian distribution function, and the Gaussian distribution function may be a mixed Gaussian density distribution function consisting of the weighted sum of a plurality of Gaussian distribution functions. The mixed Gaussian density distribution function is approximated by performing calculation with the assumption that all dimensions of the feature vector exhibit a mixed distribution independent of each other.

According to still another aspect of the invention, there is provided a pattern recognition apparatus for performing pattern recognition on the basis of calculation of the degree of matching between an input feature vector and a reference pattern, the pattern recognition apparatus comprising: scalar quantization means for scalar-quantizing the value of each dimension of an input feature vector and outputting the resultant quantized value; storage means for storing a pre-calculated output value of a reference pattern function corresponding to the quantized value; and matching degree calculation means for accumulating the output value corresponding to the quantized value for all dimensions of the reference pattern function obtained from the storage means and employing the resultant cumulative value as the degree of matching between the reference pattern and the input feature vector.

In this pattern recognition apparatus, the value stored in the storage means is optimized in such a manner as to minimize the error of the degree of matching of the reference pattern calculated from the scalar-quantized feature vector by the matching degree calculation means relative to the degree of matching of the reference pattern calculated in a more rigorous manner from the feature vector. The above-described scalar quantization means performs scalar quantization using the binary search method. The pattern recognition apparatus further comprises matching degree re-calculation means for re-calculating the degree of matching in such a manner that a reference pattern is selected on the basis of the calculated degree of matching, the degree of matching of the selected reference pattern is re-calculated directly from the input feature vector without performing scalar quantization, and the output value of the selected reference pattern is replaced by the re-calculated value. Furthermore, the above-described feature vector is a set of a plurality of feature vectors, and the matching degree calculation means calculates a set of degrees of matching. Furthermore, the reference pattern function is selected from probability density functions including Gaussian distribution functions and mixed Gaussian density distribution functions consisting of the weighted sum of a plurality of Gaussian distribution functions.

DESCRIPTION OF THE PREFERRED EMBODIMENTS

An embodiment of the present invention will be described below referring to the accompanying drawings.

Figure 1:
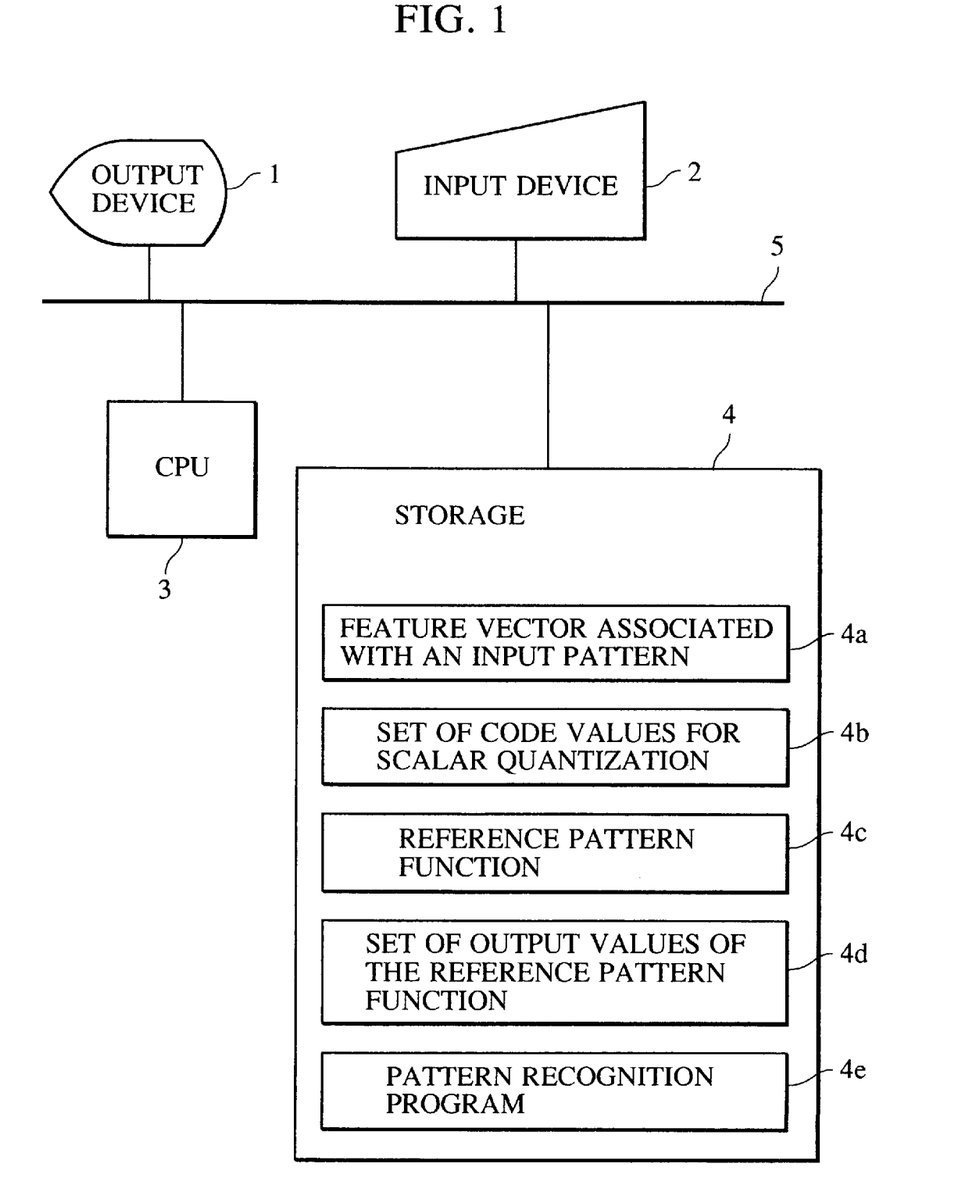
FIG. 1 is a block diagram illustrating the hardware construction of an embodiment of a pattern recognition apparatus according to the invention.

FIG. 1 is a schematic diagram illustrating the hardware construction of an embodiment of a pattern recognition apparatus according to the present invention.

In FIG. 1, reference numeral 1 denotes an output device such as a display or a printer (a laser beam printer or an ink-jet printer) for outputting a result of pattern recognition or a response corresponding to the result. Reference numeral 2 denotes an input device for inputting information such as speech or image information to be recognized wherein the input information is stored as an input pattern in a storage device 4. The speech information is input via a microphone while the image information is input via a scanner. Reference numeral 3 denotes a central processing unit (CPU) for performing numerical calculations and for controlling operations according to a procedure of the present embodiment stored in the form of a program in the storage device 4. The storage device 4 includes an external storage device such as a disk device and an internal memory device such as a RAM/ROM for storing: various variables and temporality values in the middle of calculation; a feature vector 4a associated with an input pattern; a set of code values 4b for scalar quantization; a reference pattern function 4c; a set of output values of the reference pattern function 4d; and a pattern recognition program 4e including a control program for performing the process shown in the flow chart of FIG. 2. Data is transmitted between output device 1, input device 2, CPU3 and storage device 4 via computer bus 5.

In the present embodiment, the control program used by CPU3 to perform various processes may be pre-stored in storage device 4 included in the present apparatus or the control program may be such a program provided on an external storage device which can be mounted in a removable fashion on the apparatus of the invention. Otherwise, the control program may be such a program which is down-loaded from another apparatus via communication means (not shown) including a public communication line or an LAN.

The operation of the embodiment is performed with the above hardware as described below.

Figure 2:
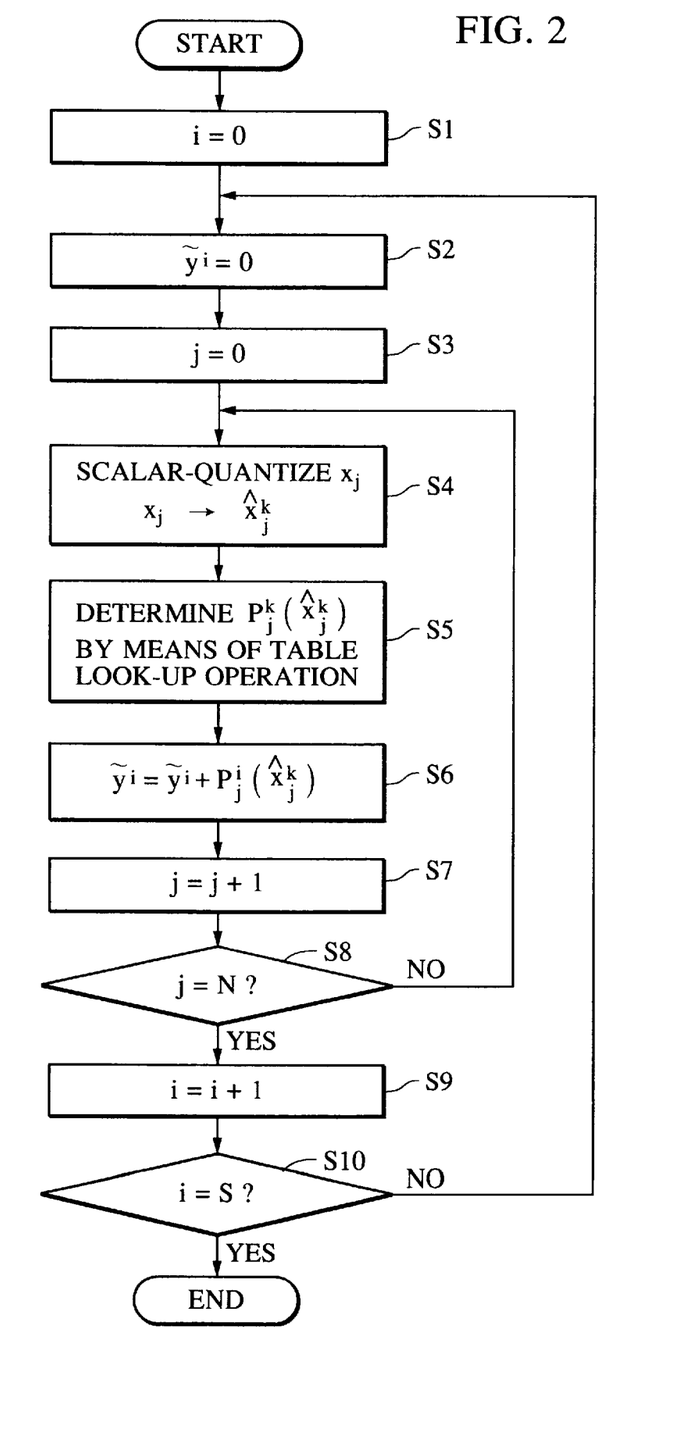
FIG. 2 is a flow chart illustrating a procedure of pattern recognition according to the embodiment of the invention.

FIG. 2 is a flow chart illustrating the procedure according to the present embodiment of the invention. According to the procedure shown in this flow chart, An input pattern is input via the input device 2, and a feature vector is extracted from the input pattern. The data associated with the extracted feature vector is stored in a feature vector storage area 4a, which is subjected to a pattern recognition process according to the flow chart shown in FIG. 2. In this embodiment, it is assumed that the number of the reference patterns is S and the dimension of the feature vector space is N. The reference patterns used in the process shown in the flow chart of FIG. 2 are stored in a reference pattern function storage area 4c of the storage device 4. The number S of the reference patterns used in the calculation of the degree of matching with an input pattern may be equal to the total number of the reference patterns stored in the reference pattern function storage area 4c, or otherwise a part of the reference patterns may be employed. Thus, S is a variable number. Furthermore, the input feature vector is denoted by x, and its jth-dimension element is denoted by $x_j$. The function cor responding to the ith reference pattern is represented by $Y^i = P^i(\cdot)$. In this embodiment, the dimensions of the feature vector space are assumed to be independent of each other, and $P^i(x)$ is given by:

$$P^i(x) = \prod_j P^i_j(x_j) \qquad (4)$$

or $$P^i(x) = \sum_j P^i_j(x_j) \qquad (5)$$

where $P^i_j(\cdot)$ is the jth-dimension function of the ith reference pattern function. The difference between equations (4) and (5) is that the latter is given in a logarithmic form. In the following description, it is assumed that $P^i(x)$ is given in the logarithmic form.

After performing initialization in steps S1 to S3, the jth-dimension value $x_j$ of the input vector x is scalar-quantized in a scalar quantization step S4. In this scalar quantization, $x^{Kj}_j$ having a value which is closest to the input value $x_j$ is selected from the set of Kj code values $\{x^1_j, x^2_j, \ldots, x^{Kj}_j\}$ which have been prepared in advance and which are stored in the scalar quantization code value storage area 4b.

Then in a table look-up step S5, a table look-up operation is performed to determine the jth-dimension output value $P^i_j(x^{Kj}_j)$ of the reference pattern function corresponding to $x^{Kj}_j$ obtained in the scalar-quantization described above. In this process, since the set of possible input values $\{x^1_j, x^2_j, \ldots, x^{Kj}_j\}$ is known, the set of possible output values $\{P^i_j(x^1_j), P^i_j(x^2_j), \ldots, P^i_j(x^{Kj}_j)\}$ is prepared in advance in the form of a table. Thus, the output value can be obtained by looking up Kjth element of the table.

Next in a cumulative matching degree calculation step S6, the result obtained in the table look-up step S5 is added to the cumulative value $y^i$ which has been obtained in the previous operation at the table look-up step S5 in the loop operation.

The steps S4 to S6 are performed repeatedly N times so as to obtain an approximate value $y^i$ of the degree of matching $Y^i$ between the input vector and the ith reference pattern. The above N-iterative operations are controlled in steps S3, S7, and S8.

Thus, the degree of matching of the input vector can be obtained quickly for all reference patterns by repeating the above-described steps S2 to S10 S times. The steps S1, S9, and S10 are for controlling the S-iterative operations.

In the scalar quantization step S4, the binary search technique may be employed to achieve a high-speed operation in the scalar quantization. In the binary search technique, the elements of the set of code values are arranged in ascending or descending order, and it is first determined whether a given jth-dimension value is included in the first half or the second half of the set. If it turned out that the jth-dimension value is in the first half of the set, the first half of the set is taken as a new set of code values, and the value is searched for in a recursive manner while the second half of the set is taken as a new set of code values if it turned out that the jth-dimension value is in the second half of the set, as shown in FIG. 3.

Figure 3:
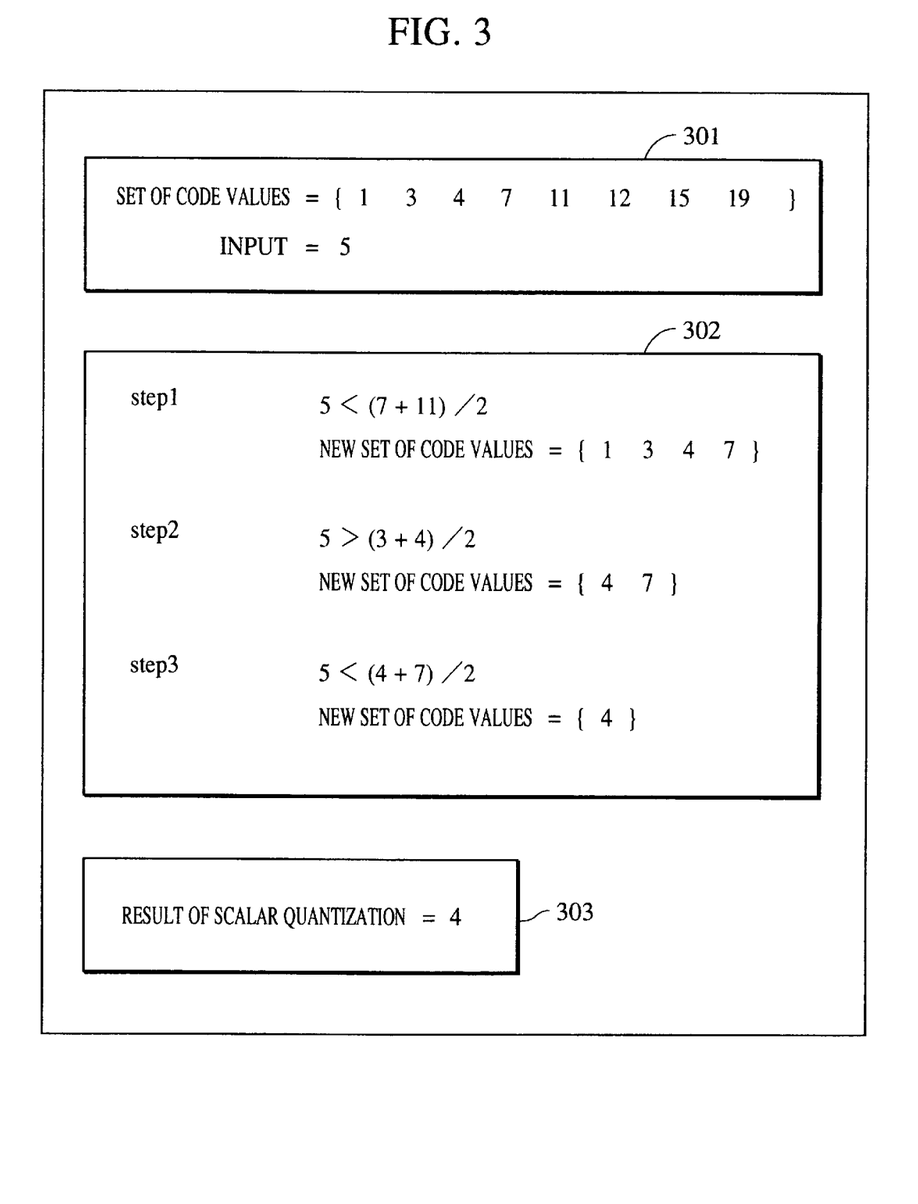
FIG. 3 is a schematic representation of an example of a binary searching process.

In FIG. 3, a set of code values and an input value to be scalar-quantized are shown in block 301. Block 302 illustrates a procedure of the binary searching.

First, it is determined whether the input value "5" is included in the first half subset $\{1, 3, 4, 7\}$ of the full set of code values $\{1, 3, 4, 7, 11, 12, 15, 19\}$ or in the second half subset {11, 12, 15, 19} (step 1). Then it is further determined whether the input value is included in a subset {1, 3} or {4, 7} of the subset {1, 3, 4, 7}. Finally, it is determined which value of the subset {4, 7} is more proper as the scalar-quantized value (step 3). Thus, "4" is finally output as the quantized value.

Alternatively, after performing a high-speed calculation of the degree of matching $y^i$ according to the technique described above, some of $y^i$ may be replaced by a value obtained by performing a rigorous calculation of the degree of matching using the equation Yi=P$^i$(x) instead of employing a scalar-quantized value. In this case, which of $y^i$ should be re-calculated may be determined according to the value of $y^i$.

For example, a predetermined number of $y^i$ which have shown the highest degrees of matching in the high-speed calculation may be taken for the re-calculation.

Alternatively, the re-calculation may also be performed as follows. In some cases, pattern recognition is performed by employing not simply a single feature vector but a set of a plurality of feature vectors $\{x_O, \ldots, x_T\}$. In such cases, sets of degrees of matching $\{Y^i_0, \ldots, Y^i_T\}$ are used to obtain a result of pattern recognition. In this pattern recognition technique, a set of degrees of matching $\{y^i_O, \ldots, y^i_T\}$ showing a good result as a whole may be taken and re-calculated so as to obtain $\{Y^i_O, \ldots, Y^i_T\}$, while the other sets employ the values obtained by the high-speed calculations.

For example, in speech recognition, when the reference patterns include {a, o, oo, g, k, n, s, t, y}, if [t oo k y oo] is taken as a time series of combined reference patterns, first, a set of matching degrees $\{y^i_O, \ldots, y^i_T\}$ is obtained according to the high-speed calculation technique of the present embodiment. Even if the result shows a very high matching degree in [t], if the result shows a very low matching degree in [oo k y oo], it would be meaningless to perform a re-calculation on [t]. On the other hand, even if [t] shows a very low matching degree, if [oo k y oo] shows good matching, it is meaningful to perform a rigorous re-calculation on [t].

If re-calculation is performed on a selected reference pattern in the above-described manner to obtain a more rigorous degree of matching, it is possible to reduce the error due to the scalar quantization and also the error due to approximation based on for example equation (15) (in this equation, the calculation which cannot be separated into individual dimensions in a rigorous sense is performed separately for each dimension thereby obtaining an approximate result).

EXAMPLE 1

In this specific example, a Gaussian distribution (multidimensional Gaussian distribution) function is employed as the reference pattern function.

The degree of matching $Y^i$ between an input x and an ith reference pattern is represented by a Gaussian distribution function N(·) having an average of $\mu^i$ and a covariance matrix $\Sigma^i$ as described below.

$$Y^i = P^i(x) = N(x; \mu^i, \Sigma^i) = \frac{1}{(2\pi)^{N/2}|\Sigma^i|^{1/2}}\exp\left\{-\frac{1}{2}(x-\mu^i)^t\Sigma^{i-1}(x-\mu^i)\right\} \quad (6)$$

In the above equation, N denotes the number of dimensions of feature vectors, and t is used to represent transposition.

$Y^i$ is calculated at a high speed using the technique of the above-described embodiment according to the invention.

With the assumption that the dimensions of the N-dimensional feature vector space are assumed to be independent, the equation (6) can be decomposed as described below:

$$Y^i = \prod_{j=1}^{N} N(x_j; \mu^i_j, \sigma^i_j) = \prod_{j=1}^{N}\left[\frac{1}{\sqrt{2\pi\sigma^i_j}}\exp\left\{-\frac{1}{2\sigma^i_j}(x_j-\mu^i_j)^2\right\}\right] \quad (7)$$

where $\mu^i_j$ denotes the average value associated with the jth dimension of the Gaussian distribution regarding the ith reference pattern, and $\sigma^i_j$ denotes the variance associated with the jth dimension of the Gaussian distribution regarding the ith reference pattern. Although the dispersion is usually denoted by $\sigma^2$, it is denoted simply by $\sigma$ in this invention.

Furthermore, a set of code values $\{x_{j,k}\}$ is prepared for use as values to which the jth-dimension value $x_j$ of an input vector x is scalar-quantized. For all values of i, j, and k, $$\hat{y}^i_{j,k} = N(\hat{x}_{j,k}; \mu^i_j, \sigma^i_j) = \frac{1}{\sqrt{2\pi\sigma^i_j}}\exp\left\{-\frac{1}{2\sigma^i_j}(\hat{x}_{j,k}-\mu^i_j)^2\right\} \quad (8)$$

is calculated and the result is stored in the form of a table in the storage device 4.

After the preprocessing described above, the degree of matching is calculated for pattern recognition as described below.

First, in step S4, a given input feature vector x is scalar-quantized for each dimension element. That is, an optimum value of Kj is determined for each dimension j, and then $$\chi x_j \rightarrow \hat{\chi}_{j,Kj} + tm \quad (9)$$

Then in a table look-up step S5, $y^i_{j,Kj}$ corresponding to $x_{j,Kj}$ is searched for by means of a table look-up operation.

Furthermore, in a cumulative matching degree calculation step S6, the result obtained in the table look-up step S5 is added to the cumulative value thereby obtaining an approximate value of $Y^i$ as described by the following equation:

$$\hat{y}^i = \prod_{j=1}^{N}\hat{y}^i_{j,K_j} \quad (10)$$

Thus, the degree of matching $Y^i$ between the input feature vector x and each reference pattern is obtained by means of the high-speed calculation technique of the invention.

As described above, $y^i$ which has been obtained for some reference patterns $\{i\}$ by means of the high-speed calculation may be replaced by a value obtained by performing rigorous calculation of the degree of matching using the equation (6) or (7).

EXAMPLE 2

In this example, a mixed Gaussian density distribution function is employed as the reference pattern function. The mixed Gaussian density distribution function refers to a weighted sum of M Gaussian distribution functions, and can be defined by:

$$P^i(x) = \sum_{m=1}^{M} w^i_m \cdot N(x; \mu^i_m, \Sigma^i_m) \quad (11)$$

$$= \sum_{m=1}^{M} w_m^j \cdot \frac{1}{(2\pi)^{N/2} |\Sigma_m^i|^{1/2}} \exp\left\{-\frac{1}{2}(x - \mu_m^i)^t \Sigma_m^{i\,-1}(x - \mu_m^i)\right\}$$

where $w_m$ denotes a weighting factor for the mth Gaussian distribution function. If the non-diagonal covariance elements of the Gaussian distribution functions is equal to 0, then $$P^i(x) = \sum_{m=1}^{M} w_m^j \cdot \prod_{j=1}^{N} \mathcal{N}(x_j; \mu_{m,j}^i, \sigma_{m,j}^i) \quad (12)$$

$$= \sum_{m=1}^{M} w_m^j \cdot \prod_{j=1}^{N} \left[ \frac{1}{\sqrt{2\pi\sigma_{m,j}^i}} \exp\left\{-\frac{1}{2\sigma_{m,j}^i}(x_j - \mu_{m,j}^i)^2\right\} \right]$$

The degree of matching is calculated according to the above mixed Gaussian density function using the technique of the above-described embodiment of the invention.

A first technique is to apply the calculation technique of the above-described embodiment to each Gaussian distribution function constituting the mixed Gaussian density distribution function.

First, a value $x_{j,Kj}$ of each dimension of an input vector x is obtained as in Embodiment 1 described above. Then, $$\hat{y}_{m,j,Kj}^i = (w_m^j)^{1/N} \cdot \mathcal{N}(\hat{x}_{j,Kj}; \mu_{m,j}^i, \sigma_{m,j}^i) \quad (13)$$

is determined by means of a table look-up operation.

Furthermore, in a cumulative matching degree calculation step S6, $y^i$ is obtained by calculating a cumulative value according to the following equation:

$$\hat{y}^i = \sum_{m=1}^{M} \prod_{j=1}^{N} \hat{y}_{m,j,Kj}^i \quad (14)$$

A second technique is to approximate equation (12) by the following equation:

$$P^i(x) = \sum_{m=1}^{M} w_m^j \cdot \prod_{j=1}^{N} \mathcal{N}(x_j; \mu_{m,j}^i, \sigma_{m,j}^i) \quad (15)$$

$$\approx \prod_{j=1}^{N} \sum_{m=1}^{M} w_m^j \cdot \mathcal{N}(x_j; \mu_{m,j}^i, \sigma_{m,j}^i)$$

A calculation similar to that in Embodiment 1 is then performed using equation (15).

First, in a scalar quantization step S4, scalar quantization is performed to obtain a value $x_{j,Kj}$ for each dimension of an input vector x. Then $$\hat{y}_{j,K_j}^i = \sum_{m=1}^{M} w_m^j \cdot \mathcal{N}(\hat{x}_{j,K_j}) \quad (16)$$

is determined by means of a table look-up operation.

Furthermore, in a cumulative matching degree calculation step S6, $y^i$ is obtained by calculating a cumulative value according to the following equation:

$$\hat{y}^i = \prod_{j=1}^{N} \hat{y}_{j,K_j}^i \quad (17)$$

A third technique is to perform learning using learning data so as to obtain a function to be used to output $P^i(x)$.

First, a set of values $\{y^i_{j,k}\}$ corresponding to a set of scalar-quantized code values $\{x_{j,k}\}$ is prepared for all values of i via learning according to a rule described later.

First, in a scalar quantization step S4, scalar quantization is performed to obtain a value $x_{j,Kj}$ for each dimension of an input vector x. Then the degree of matching is calculated according to the following equation:

$$\hat{y}^i = \prod_{j=1}^{N} \hat{y}_{j,K_j}^i \quad (18)$$

In the above calculation, $\{y^i_{j,k}\}$ corresponding to each value of i and $\{x_{j,k}\}$ is obtained using learning data as follows.

First, the square error $(\epsilon^2)^i_n$ of a vector $\xi^{n'} = (x_{1,Kn1}, \ldots, x_{N,KnN})$ obtained by scalar-quantizing an nth learning data $\xi^n = (\xi^n_1, \ldots, \xi^n_n)$ for each dimension relative to $(y_{1,Kn1}, \ldots, y_{j,KnN})$ corresponding to $\xi^{n'}$ is defined as follows:

$$\epsilon_n^{2i} = (P^i(\xi^n) - y^i)^2 \quad (19)$$

$$= \left( \sum_{m=1}^{M} \omega_m^i \cdot N(\xi^n; \mu_m^i, \Sigma_m^i) - \prod_{j=1}^{N} y_{j,k_{n,j}}^i \right)^2$$

This square error indicates an error between an approximate value of the degree of matching and a true value, which occurs when an approximate value of the degree of matching between the nth learning data and the ith reference pattern is calculated using a set of $\{y^i_{j,k}\}$.

If the set of $\{y^i_{j,k}\}$ is determined so that the square error $(\epsilon^2)^i_n$ is minimized for all learning data which have been prepared in advance, the set of $\{y^i_{j,k}\}$ can be employed to calculate a good approximate value of the degree of matching. That is, the set of $\{y^i_{j,k}\}$ is determined so that $$\sum_n \epsilon_n^{2i} \quad (20)$$

is minimized for n learning data. This can be achieved using a known technique for minimizing the error.

Alternatively, in equation (19), the square error $(\epsilon^2)^i_n$ may also be defined using an input vector $\xi^n$ which is not scalar-quantized, as follows:

$$\epsilon_n^{2i} = \left( \sum_{m=1}^{M} \omega_m^i \cdot N(\xi^n; \mu_m^i, \Sigma_m^i) - \prod_{j=1}^{N} y_{j,k_{n,j}}^i \right)^2 \quad (21)$$

As described above, the set of $\{y^i_{j,k}\}$ can be constructed again by means of learning so that the error due to the approximation based on for example equation (15) as well as the error due to the scalar quantization can be reduced.

EXAMPLE 3

In Example 1 or 2 described above, the value of the probability density function is directly employed.

Alternatively, in this example, the logarithm of the probability density function is employed in the calculations.

If the logarithmic values are used, the multidimensional probability density function can be represented by the sum, instead of the product, of probability density functions of individual dimensions. For example, equation (7) can be rewritten as:

$$Y^i = \sum_{j=1}^{N} \log\{N(x_j; \mu_j^i, \sigma_j^i)\} \tag{22}$$

Furthermore, equation (15) becomes $$P^i(x) = \log\left\{\sum_{m=1}^{M} w_m^i \cdot \prod_{j=1}^{N} \mathcal{N}(x_j; \mu_{m,j}^i, \sigma_{m,j}^i)\right\} \tag{23}$$

$$\approx \log\left\{\prod_{j=1}^{N} \sum_{m=1}^{M} w_m^i \cdot \mathcal{N}(x_j; \mu_{m,j}^i, \sigma_{m,j}^i)\right\}$$

$$= \sum_{j=1}^{N} \log\left\{\sum_{m=1}^{M} w_m^i \cdot \mathcal{N}(x_j; \mu_{m,j}^i, \sigma_{m,j}^i)\right\}$$

and equation (19) becomes $$\varepsilon_n^{2i} = \left[\log\left\{\sum_{m=1}^{M} \omega_m^i \cdot N(\xi^n; \mu_m^i, \Sigma_m^i)\right\} - \sum_{j=1}^{N} y_{j,k_{n,j}}^i\right]^2 \tag{24}$$

In this case, the error $\Sigma\epsilon_n^{2i}$ can be minimized using a multivariate statistical analysis technique such as that known as "categorical multiple regression".

The present invention may be applied to a system regardless of whether the system includes a single device or a plurality of devices. Furthermore, the present invention may also be applied to a system or an apparatus which operates under the control of a program supplied from the outside.

What is claimed is:

1. A pattern recognition method for performing pattern recognition on the basis of calculating a degree of matching between an input feature vector and a reference pattern represented by a mixed Gaussian distribution function consisting of a weighted sum of a plurality of Gaussian distribution functions, said pattern recognition method having a matching degree calculation process comprising the steps of:

a scalar quantization step in which the value of each dimension element of the input feature vector is scalar-quantized;

a table look-up step in which a table, holding a value of one dimensional mixed Gaussian distribution functions which are approximately decomposed from the said mixed Gaussian distribution functions, is subjected to a look-up operation on the basis of the quantized value obtained in said scalar quantization step; and a cumulative matching degree calculation step in which the values obtained in said table look-up step are accumulated for all dimensions, and the resultant cumulative value is employed as the degree of matching between the reference pattern and the input feature vector.

2. A pattern recognition method according to claim 1, wherein said table stores a pre-calculated value of the function which represents the reference pattern, the function corresponding to said quantized value.

3. A pattern recognition method according to claim 2, wherein the value stored in said table is optimized in such a manner as to minimize the error of the degree of matching between the reference pattern calculated from each feature vector according to the said matching degree calculation process relative to the degree of matching of the reference pattern calculated in a more rigorous manner from said each feature vector.

4. A pattern recognition method according to claim 1, wherein in said scalar quantization step, the binary search method is employed.

5. A pattern recognition method according to claim 1, wherein said reference pattern is a pattern representing a feature of speech data.

6. A pattern recognition method according to claim 1, wherein said reference pattern is a pattern representing a feature of image data.

7. A pattern recognition method according to claim 1, wherein said matching degree calculation process further comprises the steps of:

a reference pattern selection step in which plural reference patterns are selected on the basis of the degree of matching calculated in said cumulative matching degree calculation step;

a re-calculation matching degree re-calculation step in which the degree of matching between the feature vector and the reference pattern selected in said reference pattern selection step is re-calculated by calculating a value of mixed Gaussian distribution functions for the input feature vector without said dimensional decomposition; and a matching degree replacement step in which the degree of matching of said selected reference pattern is replaced by said re-calculated degree of matching in said re-calculation matching degree step.

8. A pattern recognition method according to claim 1, wherein said function which represents the reference pattern is selected from probability density functions.

9. A pattern recognition method according to claim 1, wherein said feature vector to be subjected to pattern recognition is extracted from speech data.

10. A pattern recognition method according to claim 1, wherein said feature vector to be subjected to pattern recognition is extracted from image data.

11. A pattern recognition method according to claim 1, wherein the resultant cumulative value obtained on the basis of the degree of matching between the reference pattern and said input feature vector is displayed on display means.

12. A pattern recognition apparatus for performing pattern recognition on the basis of calculating a degree of matching between an input feature vector and a reference pattern represented by a mixed Gaussian distribution function consisting of weighted sum of a plurality of Gaussian distribution functions, said pattern recognition apparatus comprising:

a scalar quantization means in which the value of each dimension element of the input feature vector is scalar-quantized;

a table look-up means in which a table, holding value of one dimensional mixed Gaussian distribution functions which are approximately decomposed from the said mixed Gaussian distribution functions, is subjected to a look-up operation on the basis of the quantized value obtained in said scalar quantization means; and a cumulative matching degree calculation means in which the values obtained from said table look-up means are accumulated for all dimensions, and the resultant cumulative value is employed as the degree of matching between the reference pattern and the input feature vector.

13. A pattern recognition apparatus according to claim 12, wherein said table stores a pre-calculated value of the function which represents the reference pattern, the function corresponding to said quantized value.

14. A pattern recognition apparatus according to claim 13, wherein the value stored in said table is optimized in such a manner as to minimize the error of the degree of matching between the reference pattern calculated from each feature vector according to said matching degree calculation process relative to the degree of matching of the reference pattern calculated in a more rigorous manner from said each feature vector.

15. A pattern recognition apparatus according to claim 12, wherein, in said scalar quantization means, the binary search method is employed.

16. A pattern recognition apparatus according to claim 12, wherein said reference pattern is a pattern representing a feature of speech data.

17. A pattern recognition method according to claim 12, wherein said reference pattern is a pattern representing a feature of image data.

18. A pattern recognition apparatus according to claim 12, further comprising:

a reference pattern selection means for selecting plural reference patterns on the basis of a degree of matching calculated in said cumulative matching degree calculation means;

a re-calculation matching degree means in which the degree of matching between the feature vector and the reference pattern selected by said reference pattern selection means is re-calculated by calculating value of mixed Gaussian distribution functions for the input feature vector without said dimensional decomposition; and a matching degree replacement means in which the degree of matching of said selected reference pattern is replaced by said re-calculated degree of matching.

19. A pattern recognition apparatus according to claim 12, wherein said function which represents the reference pattern is selected from probability density functions.

20. A pattern recognition apparatus according to claim 12, wherein said feature vector to be subjected to pattern recognition is extracted from speech data.

21. A pattern recognition apparatus according to claim 12, wherein said feature vector to be subjected to pattern recognition is extracted from image data.

22. A pattern recognition apparatus according to claim 12, wherein the resultant cumulative value obtained on the basis of the degree of matching between the reference pattern and said input feature vector is displayed on display means.

23. A memory medium storing computer-executable process steps for performing pattern recognition on the basis of calculation of the degree of matching between an input feature vector and a reference pattern represented by a mixed Gaussian distribution function consisting of weighted sum of a plurality of Gaussian distribution functions, said pattern recognition apparatus being characterized in that the matching degree calculation process comprises:

a scalar quantization step in which the value of each dimension element of the input feature vector is scalar-quantized;

a table look-up step in which a table holding value of one dimensional mixed Gaussian distribution functions which are approximately decomposed from the said mixed Gaussian distribution functions, is subjected to a look-up operation on the basis of the quantized value obtained in said scalar quantization step; and a cumulative matching degree calculation step in which the values obtained in said table look-up step are accumulated for all dimensions, and the resultant cumulative value is employed as the degree of matching between the reference pattern and the input feature vector.

* * * * *